United States Patent
Yamaoka et al.

(10) Patent No.: US 11,294,717 B2
(45) Date of Patent: Apr. 5, 2022

(54) MULTIPLE STAGE DATA STREAM PROCESSING METHOD AND DATA STREAM PROCESSING SYSTEM

(71) Applicant: FUJITSU LIMITED, Kawasaki (JP)

(72) Inventors: Hisatoshi Yamaoka, Kawasaki (JP); Kazuki Matsui, Kawasaki (JP); Tatsuro Matsumoto, Yokohama (JP); Miwa Okabayashi, Sagamihara (JP); Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 16/702,646

(22) Filed: Dec. 4, 2019

(65) Prior Publication Data
US 2020/0183740 A1  Jun. 11, 2020

(30) Foreign Application Priority Data

Dec. 6, 2018 (JP) .............................. JP2018-228761

(51) Int. Cl.
*G06F 9/48* (2006.01)
*G06F 9/38* (2018.01)

(52) U.S. Cl.
CPC .......... *G06F 9/4881* (2013.01); *G06F 9/3851* (2013.01)

(58) Field of Classification Search
None
See application file for complete search history.

(56) References Cited

U.S. PATENT DOCUMENTS

| | | | |
|---|---|---|---|
| 7,603,546 B2* | 10/2009 | Narayanasamy | G06F 8/451 713/1 |
| 10,116,670 B2* | 10/2018 | Muddu | H04L 43/00 |
| 10,474,771 B2* | 11/2019 | Devereux | G16C 20/00 |
| 2016/0269247 A1 | 9/2016 | Chakradhar et al. | |
| 2017/0142140 A1* | 5/2017 | Muddu | H04L 63/1441 |
| 2017/0228253 A1 | 8/2017 | Layman et al. | |

FOREIGN PATENT DOCUMENTS

| | | |
|---|---|---|
| JP | 2004-178270 A | 6/2004 |
| JP | 2015-215826 | 12/2015 |
| JP | 2017-142798 A | 8/2017 |

OTHER PUBLICATIONS

EESR—Extended European Search Report of European Patent Application No. 19212803.1 dated Mar. 20, 2020.

* cited by examiner

*Primary Examiner* — Van H Nguyen
(74) *Attorney, Agent, or Firm* — Fujitsu Patent Center

(57) ABSTRACT

A computer-implemented data stream processing method includes generating, calculating, and deploying. The generating includes generating a directed graph in which processes in a stream processing infrastructure are represented by nodes and data input/output relationships between the nodes are represented by edges. The calculating includes calculating a degree of each of the nodes based on a weight of each of the edges. The deploying includes deploying, based on the calculated degree of each of the nodes, the processes represented by the nodes at stages of a pipeline in the stream processing infrastructure.

9 Claims, 14 Drawing Sheets

FIG. 2A
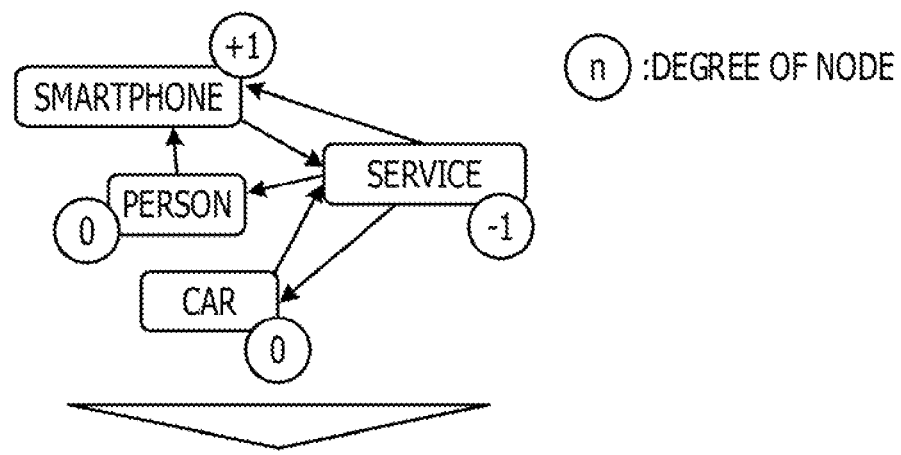
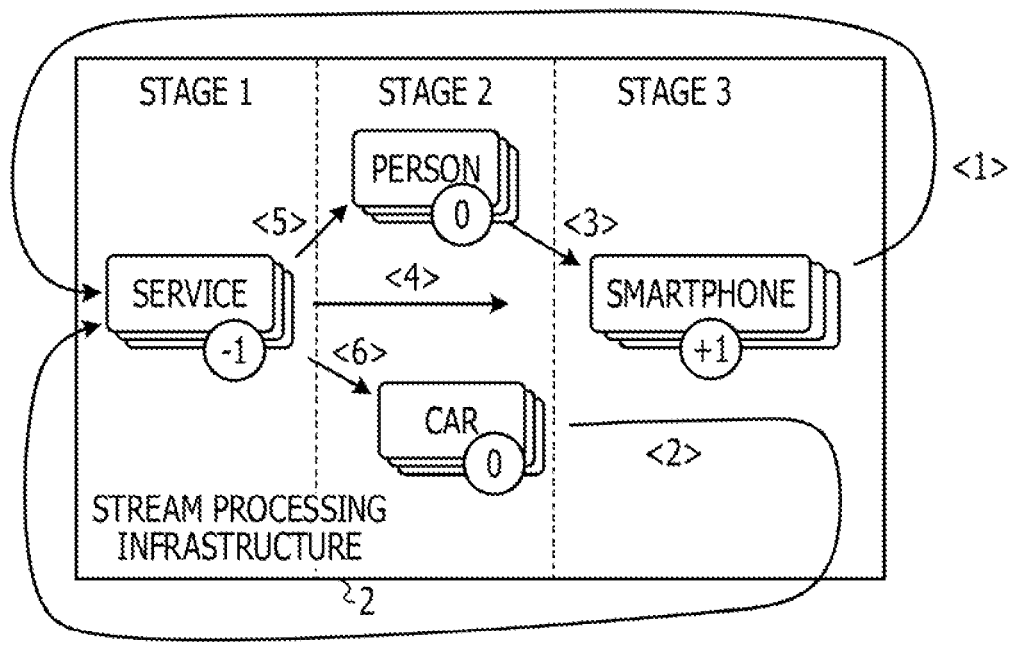
WHEN PROCESSES ARE DEPLOYED AT STAGES BASED ON DEGREES IN GRAPH (STAGING IN ASCENDING ORDER OF DEGREES)
NUMBER OF RE-INPUTS: 2

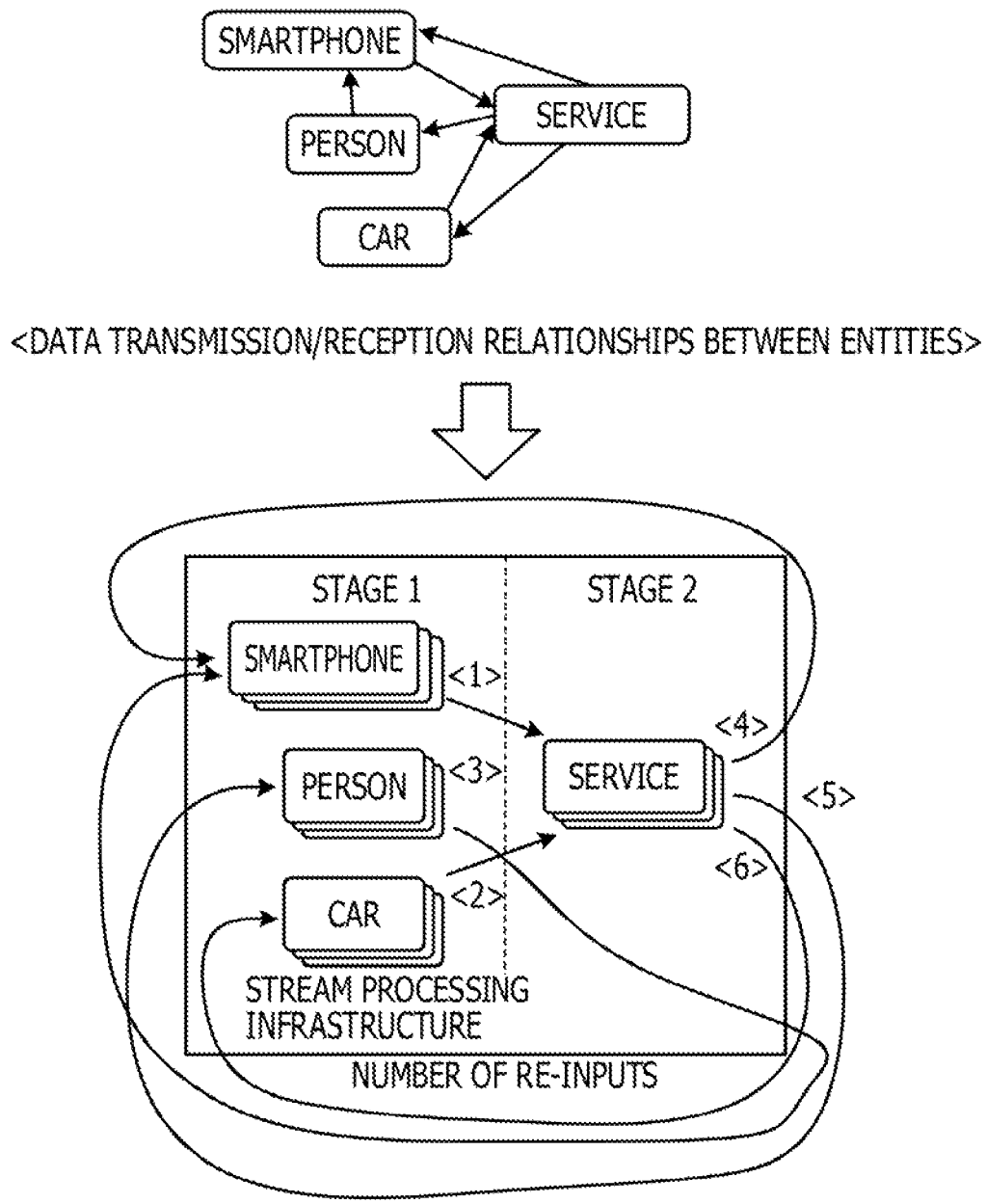

MULTIPLE STAGE DATA STREAM PROCESSING METHOD AND DATA STREAM PROCESSING SYSTEM

CROSS-REFERENCE TO RELATED APPLICATION

This application is based upon and claims the benefit of priority of the prior Japanese Patent Application No. 2018-228761, filed on Dec. 6, 2018, the entire contents of which are incorporated herein by reference.

FIELD

The embodiment discussed herein is related to a data stream processing technology or the like.

BACKGROUND

A technique for automatically generating a stream processing pipeline is disclosed. In a stream processing pipeline, a stream processing infrastructure causes data to flow from an upstream stage to a downstream stage of the pipeline. Examples of the stream processing infrastructure include Apache Flink (registered trademark).

FIG. 11 is a diagram illustrating a reference example of a pipeline of a stream processing infrastructure. As illustrated in FIG. 11, the stream processing infrastructure causes data to flow from a process at an upstream stage to a process at a downstream stage of the pipeline. A service designer determines a stage to which a process belongs in consideration of a relationship among the process, a preceding process, and a following process.

For example, the related art is disclosed in Japanese Laid-open Patent Publication No. 2017-142798 and Japanese Laid-open Patent Publication No. 2004-178270.

SUMMARY

According to an aspect of the embodiments, a computer-implemented data stream processing method includes generating a directed graph in which processes in a stream processing infrastructure are represented by nodes and data input/output relationships between the nodes are represented by edges, calculating a degree of each of the nodes based on a weight of each of the edges, and deploying, based on the calculated degree of each of the nodes, the processes represented by the nodes at stages of a pipeline in the stream processing infrastructure.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram (1) illustrating an overview of creation of a stream processing flow according to the embodiment;

FIG. 13 is a diagram (2) illustrating a reference example of data transmission/reception in a stream processing infrastructure.

DESCRIPTION OF EMBODIMENTS

It is known that a stream processing infrastructure causes data to flow from an upstream stage to a downstream stage of a pipeline but it is difficult to cause the data to flow from the downstream stage to the upstream stage of the pipeline. Accordingly, it is conceived that the stream processing infrastructure re-inputs the data to an upstream stage that is the first stage from a downstream stage that is the last stage.

However, when the data is simply re-input to the upstream stage that is the first stage from the downstream stage that is the last stage, an amount of data that is re-input may increase in some cases. This may problematically cause deterioration in performance. It is also difficult to determine which stage which process is to be deployed at to make a data flow in the pipeline efficient without causing deterioration in performance.

An embodiment of a data stream processing method, a data stream processing program, and a data stream processing system disclosed in the present application will be described in detail below with reference to the drawings. Note that the present disclosure is not limited to the embodiment.

Figure 12:
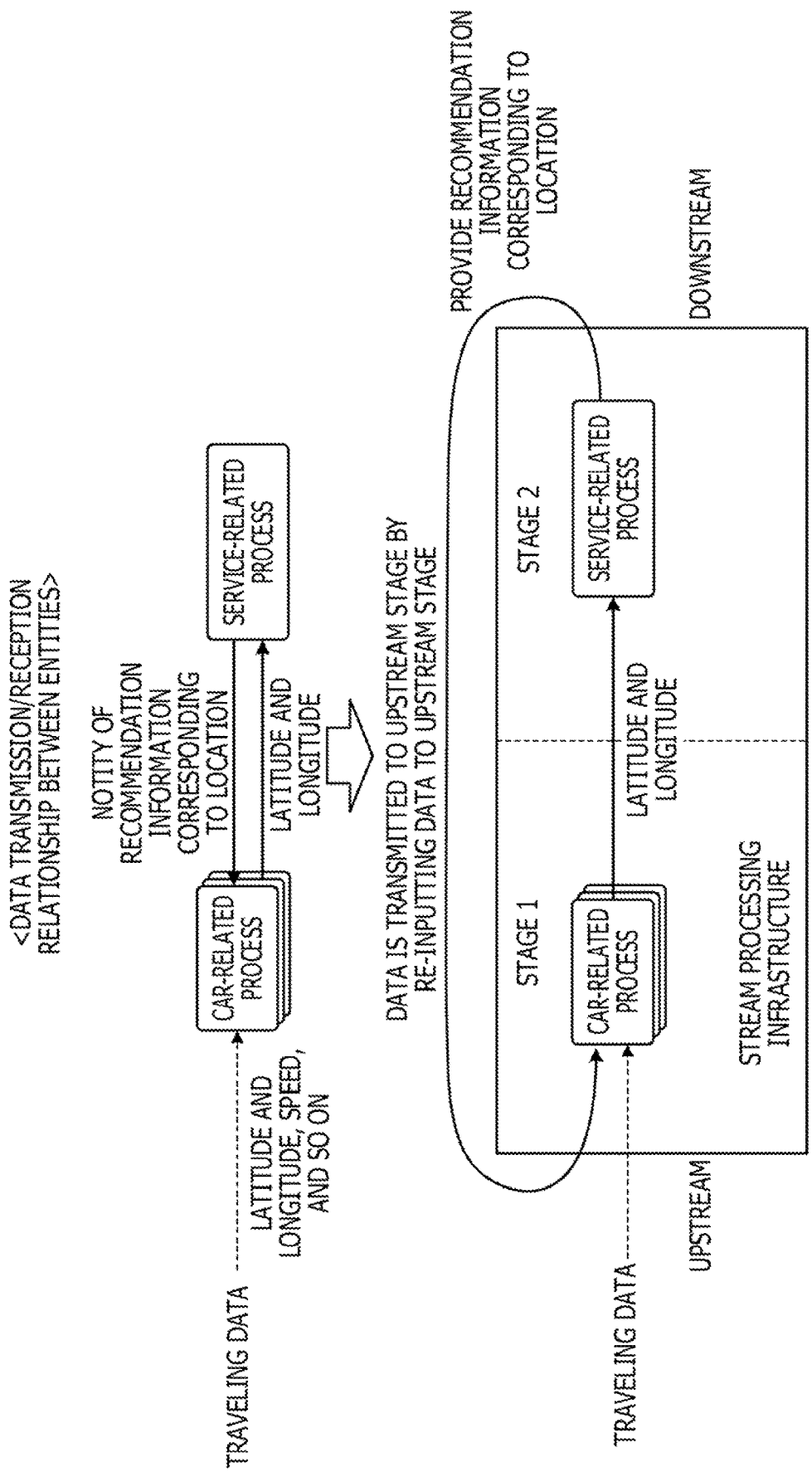
FIG. 12 is a diagram (1) illustrating a reference example of data transmission/reception in a stream processing infrastructure.

First, a reference example of data transmission/reception in a stream processing infrastructure will be described with reference to FIGS. 12 and 13. FIGS. 12 and 13 are diagrams each illustrating a reference example of data transmission/reception in a stream processing infrastructure.

An upper diagram of FIG. 12 illustrates a data transmission/reception relationship between entities. The entities in this case refer to, for example, "process names", and are, for example, a car-related process and a service-related process. In this case, a plurality of car-related processes receive traveling data including latitude and longitude, speed, and so on and transmit the longitude and latitude to the service-related process. The service-related process notifies each of the car-related processes of recommendation information corresponding to a location by using the latitude and longitude.

A lower diagram of FIG. 12 illustrates how processes having the data transmission/reception relationship between the entities illustrated in the upper diagram of FIG. 12 are implemented in a stream processing infrastructure. In the stream processing infrastructure, the car-related processes are deployed at a stage 1 located upstream and the service-related process is deployed at a stage 2 located downstream. Each of the car-related processes deployed at the stage 1 receives traveling data input to the stream processing infrastructure and transmits the latitude and longitude to the service-related process deployed at the stage 2. The service-related process deployed at the stage 2 notifies each of the car-related processes deployed at the upstream stage of recommendation information corresponding to the location by using the latitude and longitude. In a stream processing infrastructure, data is not allowed to flow from a downstream stage to an upstream stage of a pipeline. This is because, for example, if data is allowed to flow from a downstream stage to an upstream stage, performance may be affected by the behavior of a barrier marker. Accordingly, in the stream processing infrastructure, data output from the stream processing infrastructure is re-input to the first stage of the stream processing infrastructure.

An upper diagram of FIG. 13 illustrates data transmission/reception relationships between entities that are different from that illustrated in FIG. 12. The entities in this case refer to processes performed by individual targets and are, for example, a car-related process performed by a car, a person-related process performed by a person, a smartphone-related process and a service-related process performed by a smartphone. The various processes are simply referred to as car, person, smartphone, and service in FIG. 13. It is assumed that an arrow indicates the direction of a data flow. The upper diagram of FIG. 13 illustrates a directed graph of coupling relationships between the car-related process, the person-related process, the smartphone-related process, and the service-related process.

A lower diagram of FIG. 13 illustrates how the processes in the directed graph illustrated in the upper diagram of FIG. 13 are implemented in a stream processing infrastructure. In this case, in the stream processing infrastructure, the processes that simply receive data directly are deployed at a stage 1 that is the first stage and the service-related process is deployed at a stage 2 that is the subsequent stage. In the stream processing infrastructure, data output from the service-related process is re-input to the first stage of the stream processing infrastructure. Consequently, an amount of data that is re-input to the first stage increases, causing deterioration in performance. In this case, for four communication paths <3> and <4> to <6> among six communication paths <1> to <6>, data is output from the stream processing infrastructure and is re-input to the first stage of the stream processing infrastructure. Consequently, an amount of data that is re-input increases, causing deterioration in performance. Firstly, communication via outside of the stream processing infrastructure increases a network load. Secondly, a load of a parsing process for converting the data into internal data when the data is re-input to the stream processing infrastructure increases. Thirdly, when a backup signal arrives when the data is outside the stream processing infrastructure, the data that is outside is not in the management range, resulting in a decrease in fault tolerance. Fourthly, since distributed processing is not performed outside of the stream processing infrastructure, distribution efficiency lowers. That is, outputting the data from the stream processing infrastructure may cause deterioration in performance.

A service designer may define data transmission/reception relationships between entities such that deterioration in performance is not caused. However, it is difficult to efficiently define the data transmission/reception relationships between entities without being cognizant of the stages.

Accordingly, a data stream processing system that automatically creates an efficient data flow in a pipeline in a stream processing infrastructure will be described below.

Figure 1:
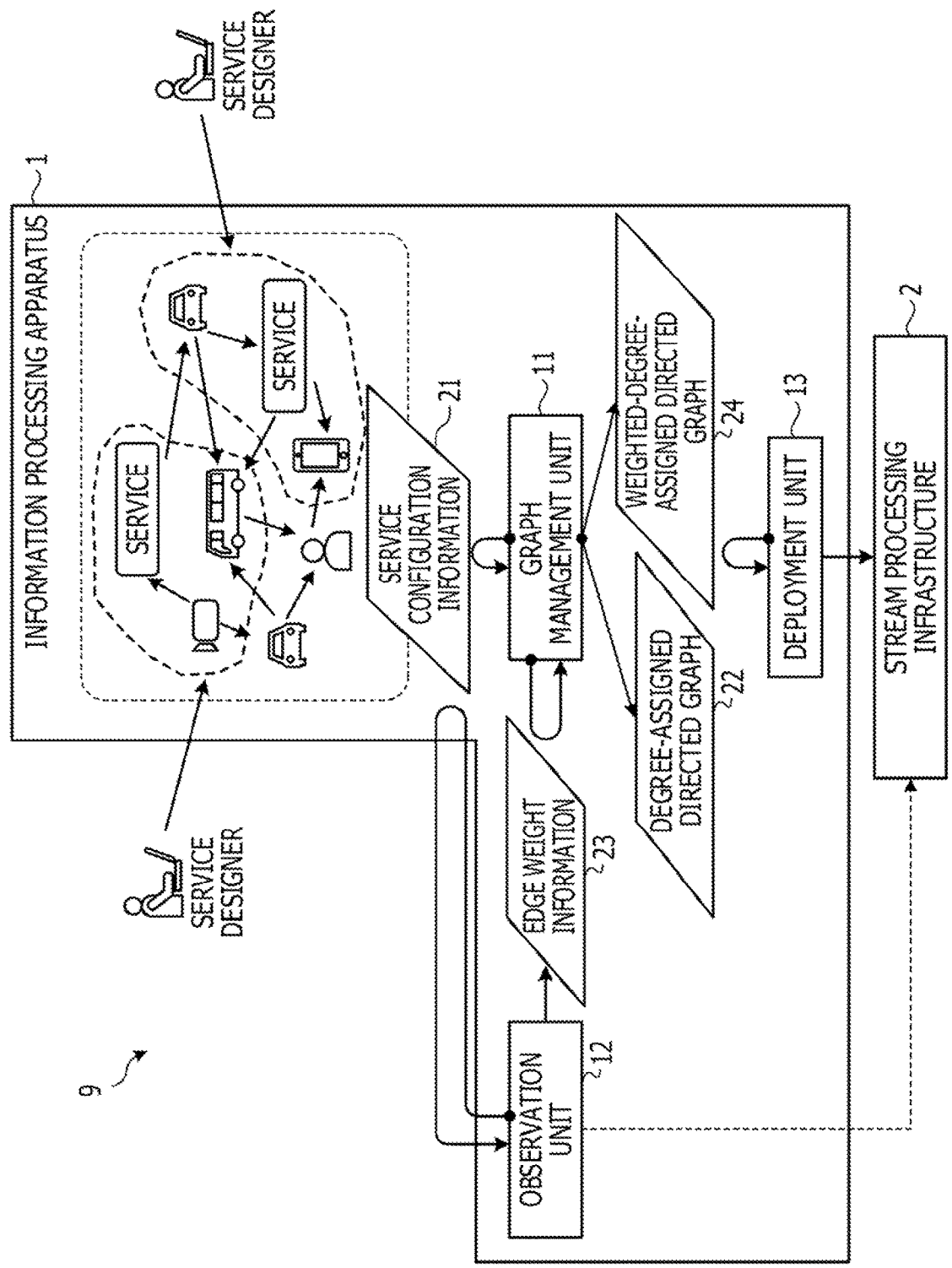
FIG. 1 is a functional block diagram illustrating a configuration of a data stream processing system according to an embodiment.

FIG. 1 is a functional block diagram illustrating a configuration of a data stream processing system according to an embodiment. As illustrated in FIG. 1, a data stream processing system 9 includes an information processing apparatus 1 and a stream processing infrastructure 2.

In the data stream processing system 9, the information processing apparatus 1 expresses coupling relationships between processes defined by a service designer in a form of a directed graph, calculates a degree of each node representing a corresponding one of the processes, and rearranges the processes represented by the respective nodes in accordance with the degrees to deploy the processes at the corresponding stages of the pipeline. The degree refers to a numerical value relating to the data transmission/reception relationships in which the node is involved. Note that a specific example of the degree will be described later.

The stream processing infrastructure 2 indicates a platform for distributed stream processing that is performed in a pipeline constituted by a plurality of stages. Examples of the stream processing infrastructure 2 include Apache Flink.

Figure 2B:
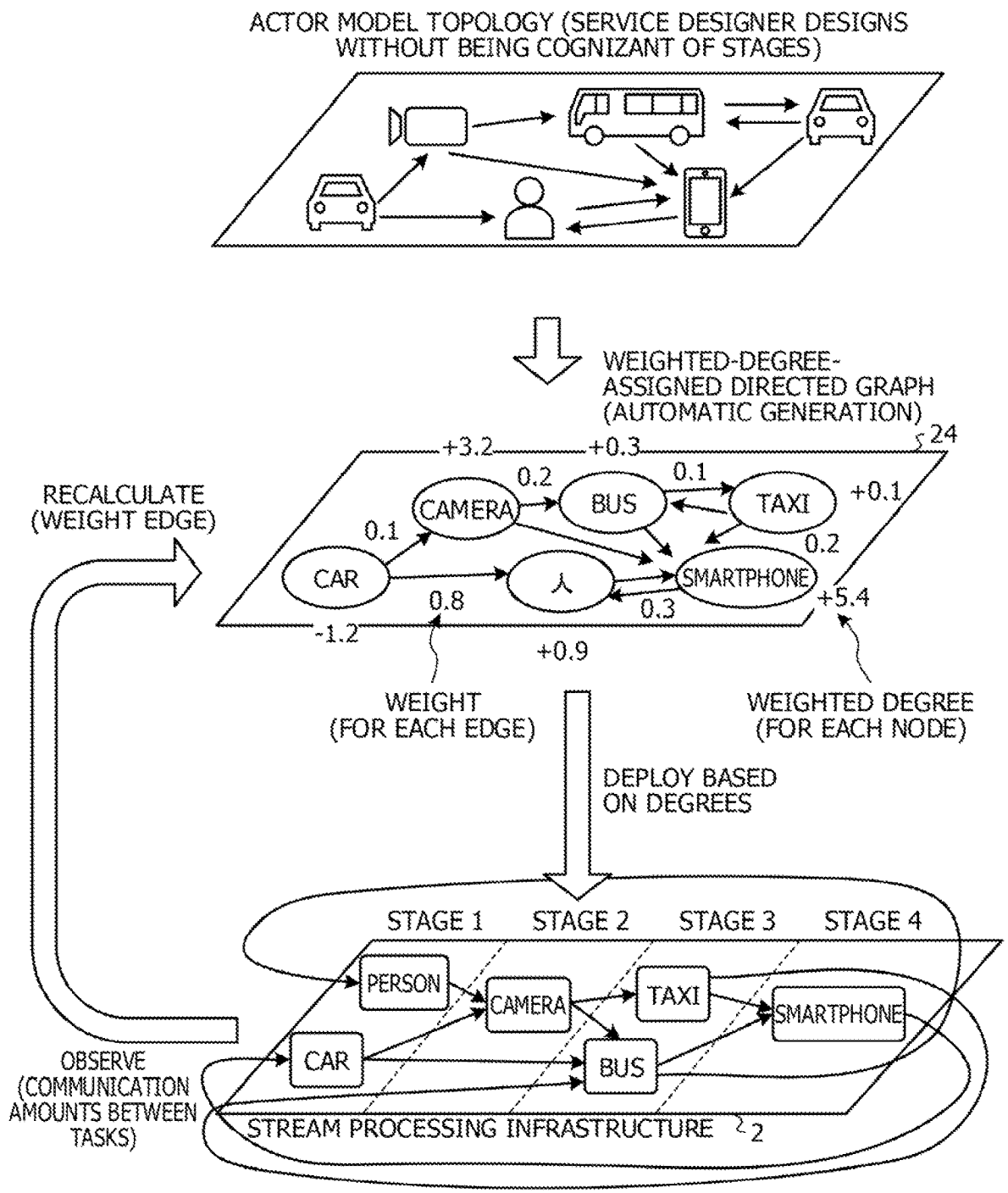
FIG. 2B is a diagram (2) illustrating an overview of creation of a stream processing flow according to the embodiment.

An overview of creation of a stream processing flow (pipeline flow) performed by the information processing apparatus 1 according to the embodiment will now be described with reference to FIGS. 2A and 2B. FIGS. 2A and 2B are diagrams each illustrating an overview of creation of the stream processing flow according to the embodiment.

As illustrated in an upper diagram of FIG. 2A, the information processing apparatus 1 expresses coupling relationships between processes defined by a service designer in a form of a directed graph. In the upper diagram of FIG. 2A, coupling relationships between processes of a car, a person, a smartphone, and a service are expressed in a form of a directed graph as an example. The information processing apparatus 1 then calculates the degree of each node. The degree of a node refers to a numerical value relating to data transmission/reception relationships in which the node is involved. For example, the degree of a node is calculated by subtracting the number of outgoing edges of the node (the number of outflows) from the number of incoming edges of the node (the number of inflows).

As illustrated in a lower diagram of FIG. 2A, the information processing apparatus 1 deploys the processes represented by the respective nodes at the corresponding stages of the pipeline of the stream processing infrastructure 2, in ascending order of the calculated degrees of the nodes. In other words, the information processing apparatus 1 deploys a process (task) represented by a node into which a less amount of data flows at a more upstream stage. This is because the number of communication paths via which data is re-input to the first stage reduces and consequently an efficient data flow may be created.

In this case, the service-related process represented by the node having the smallest degree is deployed at a stage 1. The person-related process and the car-related process represented by the nodes having the next smallest degree are deployed at a stage 2. The smartphone-related process represented by the node having the largest degree is deployed at a stage 3. In this case, for two communication paths <1> and <2> among six communication paths <1> to <6>, data is output from the stream processing infrastructure and is re-input to the first stage of the stream processing infrastructure.

When the same directed graph is implemented in the stream processing infrastructure without performing any processing on the directed graph, the number of communication paths via which data is re-input to the stream processing infrastructure 2 is equal to "4" (see FIG. 13). In contrast, when the processes are deployed in the stream processing infrastructure based on the degrees, the number of communication paths via which data is re-input to the stream processing infrastructure 2 is equal to "2". In this way, the information processing apparatus 1 reduces the number of communication paths via which data is re-input to the first stage of the stream processing infrastructure 2. Consequently, the information processing apparatus 1 may suppress deterioration in performance of the stream processing infrastructure 2. That is, the information processing apparatus 1 may automatically create an efficient data flow in a pipeline in the stream processing infrastructure 2.

In FIG. 2A, the case has been described in which the information processing apparatus 1 calculates the degree of each node by determining, as the degree, a value obtained by subtracting the number of outflows from the number of inflows based on the input and output directions of the edges. In FIG. 2B, the case will be described in which the information processing apparatus 1 calculates, for each node, the degree of the node by further using an actual communication amount as a weight.

As illustrated in an upper diagram of FIG. 2B, the information processing apparatus 1 expresses coupling relationships between processes defined by a service designer in a form of a directed graph. In this case, coupling relationships between processes (tasks) of a car, a person, a smartphone, a bus, a taxi, and a camera are represented in a form of a directed graph as an example.

As illustrated in a middle diagram of FIG. 2B, the information processing apparatus 1 observes a data communication amount between the tasks. The information processing apparatus 1 calculates a weight for each edge constituting the directed graph in accordance with the data communication amount between the corresponding tasks. The information processing apparatus 1 then calculates the degree of each node in consideration of the weights of the edges. The degree calculated in consideration of the weights of the edges is referred to as a "weighted degree". The weighted degree of a node is calculated by subtracting a weight of an outgoing edge of the node from a weight of an incoming edge of the node.

As illustrated in a lower diagram of FIG. 2B, the information processing apparatus 1 deploys the processes represented by the respective nodes at the corresponding stages of the pipeline of the stream processing infrastructure 2 in ascending order of the calculated weighted degrees of the nodes. In other words, the information processing apparatus 1 deploys a process (task) represented by a node having a less inflow data communication amount at a more upstream stage. This is because a communication amount of the communication path via which data is re-input to the first stage reduces and consequently an efficient data flow may be created.

In this way, the information processing apparatus 1 reduces a communication amount of the communication path via which data is re-input to the first stage of the stream processing infrastructure 2. Consequently, the information processing apparatus 1 may suppress deterioration in performance of the stream processing infrastructure 2. That is, the information processing apparatus 1 may automatically create an efficient data flow in a pipeline in the stream processing infrastructure 2.

Referring back to FIG. 1, the information processing apparatus 1 includes a graph management unit 11, an observation unit 12, and a deployment unit 13. These functional units are included in a controller (not illustrated). The controller corresponds to an electronic circuit such as a central processing unit (CPU). The controller includes an internal memory that stores control data and programs defining various processing procedures. The controller performs various processes based on these programs and control data. Note that the graph management unit 11 is an example of a calculation unit. The deployment unit 13 is an example of a deployment unit.

The information processing apparatus 1 also includes service configuration information 21, a degree-assigned directed graph 22, edge weight information 23, and a weighted-degree-assigned directed graph 24. These functional units are included in a storage unit (not illustrated). The storage unit is, for example, a semiconductor memory element such as a random-access memory (RAM) or a flash memory, or a storage device such as a hard disk or an optical disk.

The service configuration information 21 is configuration information of services that utilize the stream processing infrastructure 2. The service configuration information 21 expresses a directed graph indicating coupling relationships between processes in a form of a two-dimensional table. Note that the directed graph is generated by the service designer. The service configuration information 21 is generated based on the directed graph.

Figure 3:
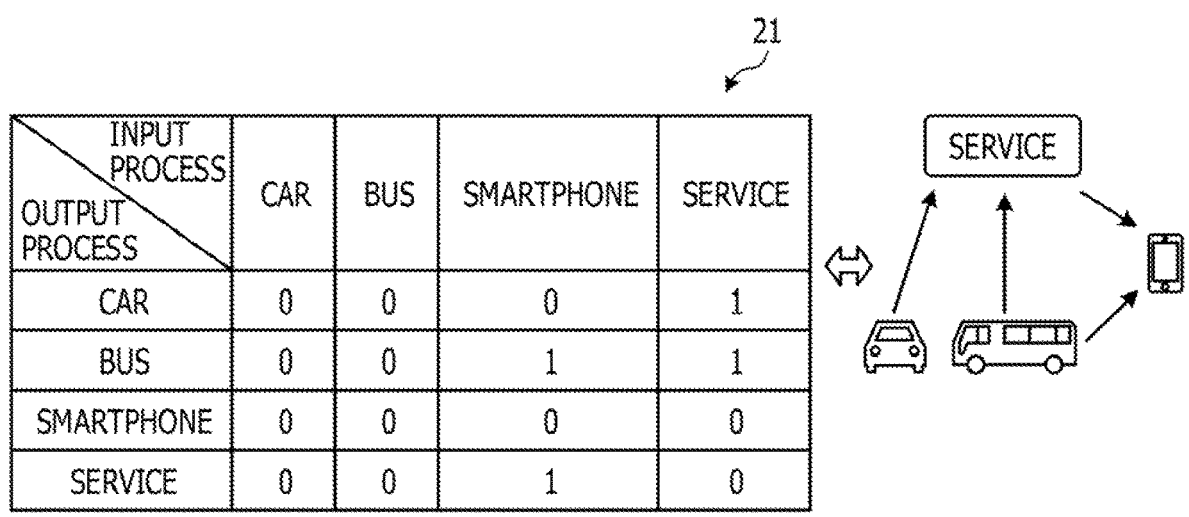
FIG. 3 is a diagram illustrating an example of service configuration information according to the embodiment.

An example of the service configuration information 21 will now be described with reference to FIG. 3. FIG. 3 is a diagram illustrating an example of a service configuration information according to the embodiment. In FIG. 3, a case is assumed in which a car-related process, a bus-related process, a smartphone-related process, and a service-related process are present as the processes. A left diagram of FIG. 3 illustrates the service configuration information of the directed graph illustrated in a right diagram of FIG. 3. Whether there is a coupling relationship from a process that outputs data to a process that receives the data is set. When there is a coupling relationship from the process to the process, "1" indicating that there is a coupling relationship is set. When there is no coupling relationship from the process to the process, "0" indicating that there is no coupling relationship is set.

As an example, since there is a coupling relationship from the car-related process to the service-related process, "1" is set in a portion where a row of the car-related process serving as the process that outputs data intersects with a column of the service-related process serving as the process that receives the data in a matrix. Since there is a coupling relationship from the service-related process to the smartphone-related process, "1" is set in a portion where a row of the service-related process serving as the process that outputs data intersects with a column of the smartphone-related process serving as the process that receives the data in the matrix. Since there is no coupling relationship from the service-related process to the car-related process, "0" is set in a portion where the row of the service-related process serving as the process that outputs data intersects with a column of the car-related process serving as the process that receives the data in the matrix.

Referring back to FIG. 1, the degree-assigned directed graph 22 is information of a directed graph including nodes each of which is assigned a degree. Note that the degree-assigned directed graph 22 is generated by the graph management unit 11.

Figure 4:
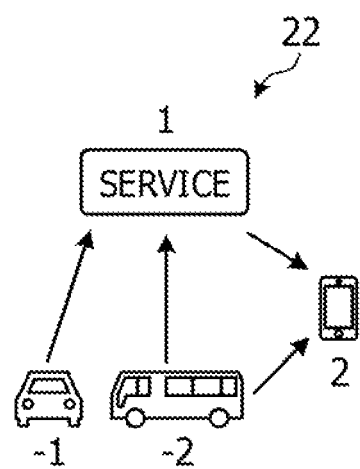
FIG. 4 is a diagram illustrating an example of a degree-assigned directed graph according to the embodiment.

An example of the degree-assigned directed graph 22 will now be described with reference to FIG. 4. FIG. 4 is a diagram illustrating an example of a degree-assigned directed graph according to the embodiment. The degrees illustrated in FIG. 4 are degrees calculated in the case of the directed graph illustrated in the right diagram of FIG. 3. The degree of the car-related process is equal to "−1", which is obtained by subtracting "1" which is the number of outgoing edges of the node of the car-related process from "0" which is the number of incoming edges of the node of the car-related process. The degree of the bus-related process is equal to "−2", which is obtained by subtracting "2" which is the number of outgoing edges of the node of the bus-related process from "0" which is the number of incoming edges of the node of the bus-related process. The degree of the smartphone-related process is equal to "2", which is obtained by subtracting "0" which is the number of outgoing edges of the node of the smartphone-related process from "2" which is the number of incoming edges of the node of the smartphone-related process. The degree of the service-related process is equal to "1", which is obtained by subtracting "1" which is the number of outgoing edges of the node of the service-related process from "2" which is the number of incoming edges of the node of the service-related process.

The degree-assigned directed graph 22 illustrated in FIG. 4 is obtained by adding the degree calculated for each node to the node in the directed graph. In FIG. 4, the numerical value added above or below each process indicates the degree of the node.

Referring back to FIG. 1, the edge weight information 23 is information about weights of the respective edges constituting the directed graph. Note that the edge weight information 23 is generated by the observation unit 12.

Figure 5:
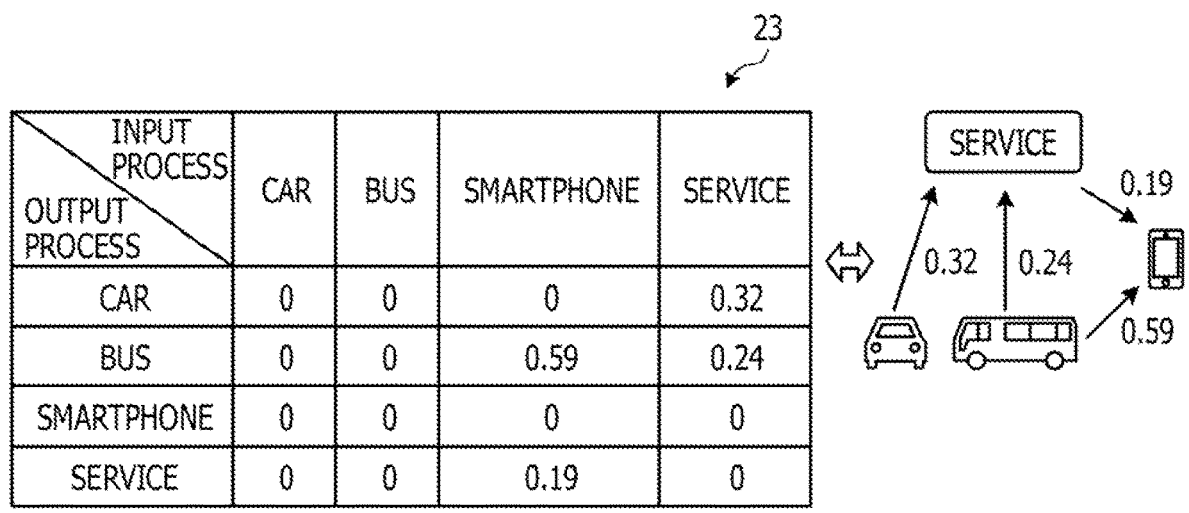
FIG. 5 is a diagram illustrating an example of edge weight information according to the embodiment.

An example of the edge weight information 23 will now be described with reference to FIG. 5. FIG. 5 is a diagram illustrating an example of an edge weight information according to the embodiment. The edge weight information 23 illustrated in a left diagram of FIG. 5 is information obtained in the case of the directed graph illustrated in the right diagram of FIG. 3. A weight of an edge in a direction from a process that outputs data to a process that receives the data is calculated. The weight of the edge is calculated according to a communication amount of data flowing in the direction of the edge.

As an example, "0.32" is calculated as a weight according to a communication amount of data flowing in a direction from the car-related process to the service-related process. "0.19" is calculated as a weight according to a communication amount of data flowing from the service-related process to the smartphone-related process.

Note that a directed graph illustrated in a right diagram of FIG. 5 is a directed graph obtained by assigning a weight to each of the edges in the directed graph illustrated in the right diagram of FIG. 3.

Referring back to FIG. 1, the weighted-degree-assigned directed graph 24 is information of a directed graph including nodes each of which is assigned a weighted degree. Note that the weighted-degree-assigned directed graph 24 is generated by the graph management unit 11.

Figure 6:
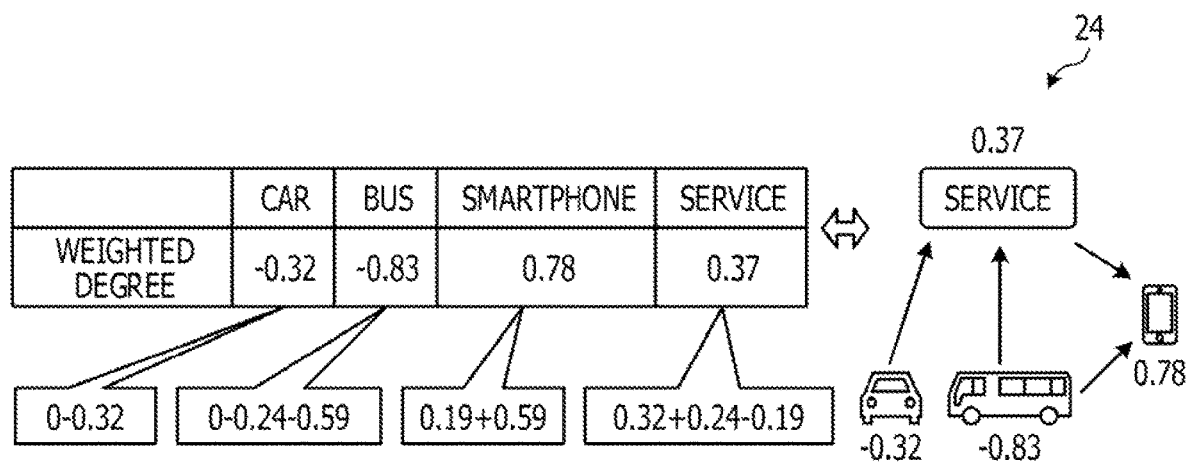
FIG. 6 is a diagram illustrating an example of a weighted-degree-assigned directed graph according to the embodiment.

An example of the weighted-degree-assigned directed graph 24 will now be described with reference to FIG. 6. FIG. 6 is a diagram illustrating an example of a weighted-degree-assigned directed graph according to the embodiment. It is assumed that the weighted degree illustrated in a left diagram of FIG. 6 is calculated from the weights assigned to the respective edges of the directed graph illustrated in the right diagram of FIG. 5. The weighted degree of the car-related process is equal to "−0.32", which is obtained by subtracting "0.32" which is a weight of the outgoing edge of the node of the car-related process from "0" which is a weight of the incoming edge of the node of the car-related process. The weighted degree of the bus-related process is equal to "−0.83", which is obtained by subtracting "0.24" and "0.59" which are weights of the outgoing edges of the node of the bus-related process from "0" which is a weight of the incoming edge of the node of the bus-related process. The weighted degree of the smartphone-related process is equal to "0.78", which is obtained by subtracting "0" which is a weight of the outgoing edge of the node of the smartphone-related process from "0.59" and "0.19" which are weights of the incoming edges of the node of the smartphone-related process. The weighted degree of the service-related process is equal to "0.37", which is obtained by subtracting "0.19" which is a weight of the outgoing edge of the node of the service-related process from "0.32" and "0.24" which are weights of the incoming edges of the node of the service-related process.

The weighted-degree-assigned directed graph 24 illustrated in a right diagram of FIG. 6 is a directed graph in which the weighted degree calculated for each node is added to the node. In the right diagram of FIG. 6, the numerical value added above or below each process indicates the weighted degree of the node.

Referring back to FIG. 1, the graph management unit 11 generates the degree-assigned directed graph 22 from the service configuration information 21 at a first timing. Examples of the first timing include a case where a change occurs in the service configuration information 21. For example, the graph management unit 11 acquires the service configuration information 21 at the first timing. The graph management unit 11 generates a directed graph obtained from the acquired service configuration information 21. The graph management unit 11 calculates the degree of each node in the directed graph. For example, the graph management unit 11 subtracts, for each node of the directed graph, the number of outgoing edges of the node (the number of outflows) from the number of incoming edges of the node (the number of inflows) to calculate the degree that is the subtraction result. The graph management unit 11 generates the degree-assigned directed graph 22 in which the calculated degrees of the respective nodes are added to the directed graph. The graph management unit 11 then stores the generated degree-assigned directed graph 22 in a storage unit (not illustrated).

The graph management unit 11 also generates the weighted-degree-assigned directed graph 24 from the edge weight information 23 at a second timing. Examples of the second timing include a case where a change occurs in the edge weight information 23. For example, the graph management unit 11 acquires the edge weight information 23 at the second timing. The graph management unit 11 calculates the weighted degree of each node in the directed graph with reference to the edge weight information 23. For example, with reference to the edge weight information 23, the graph management unit 11 subtracts, for each node of the directed graph, the weight of the outgoing edge of the node from the weight of the incoming edge of the node to calculate the weighted degree that is the subtraction result. The graph management unit 11 generates the weighted-degree-assigned directed graph 24 in which the calculated weighted degrees of the respective nodes are added to the directed graph. The graph management unit 11 then stores the generated weighted-degree-assigned directed graph 24 in the storage unit.

The observation unit 12 observes a data communication amount between processes in the stream processing infrastructure 2. For example, the observation unit 12 inquires the stream processing infrastructure 2 about the data communication amount between processes having a coupling relationship obtained from the service configuration information 21 every certain period. The observation unit 12 calculates the weight of the edge between the corresponding nodes in accordance with the data communication amount between the processes. That is, the observation unit 12 reflects information about the data communication amount between the processes as the weight of the edge in the directed graph. The observation unit 12 then stores the weight of the edge between the nodes in the edge weight information 23. Note that any technique of the related art may be used as the method for calculating the weight from the communication amount.

The deployment unit 13 sets the number of stages in the stream processing infrastructure 2. For example, the deployment unit 13 determines the required number of stages from the degree-assigned directed graph 22. The deployment unit 13 sets the required number of stages in the stream processing infrastructure 2. As an example, in the case of the degree-assigned directed graph 22 illustrated in FIG. 4, the deployment unit 13 determines the required number of stages is equal to "4" because there are four different degrees. The deployment unit 13 then sets the required number of stages of "4" in the stream processing infrastructure 2.

The deployment unit 13 also deploys the processes represented by the respective nodes at the corresponding stages of the pipeline in order of the degrees of the respective nodes. For example, in the case where the weighted-degree-assigned directed graph 24 is not stored in the storage unit, the deployment unit 13 deploys the processes represented by the respective nodes at the corresponding stages of the stream processing infrastructure 2 such that each node having a smaller degree in the degree-assigned directed graph 22 is at a more upstream stage. In addition, in the case where the weighted-degree-assigned directed graph 24 is stored in the storage unit, the deployment unit 13 deploys the processes represented by the respective nodes at the corresponding stages of the stream processing infrastructure 2 such that each node having a smaller weighted degree in the weighted-degree-assigned directed graph 24 is at a more upstream stage.

Note that the deployment unit 13 may dynamically redeploy the processes in the pipeline based on the weighted-degree-assigned directed graph 24 in response to a change in the situation. As an example, the deployment unit 13 may redeploy, in response to a specific trigger, the processes in the pipeline of the stream processing infrastructure 2 based on the weighted-degree-assigned directed graph 24 in which the latest weights are reflected. Examples of the specific trigger include a regular-timing-based method, a threshold-based method, or a partial method. The regular-timing-based method is a method of redeploying the processes at a predetermined time such as 0 o'clock every day, for example. The threshold-based method is a method of redeploying the processes when a predicted value of a resource consumption reducing effect obtained by application of the latest pipeline exceeds a threshold. The partial method is a method for dividing the weighted-degree-assigned directed graph 24 and individually redeploying some of the processes expected to improve, instead of deploying all the processes at once.

Figure 7:
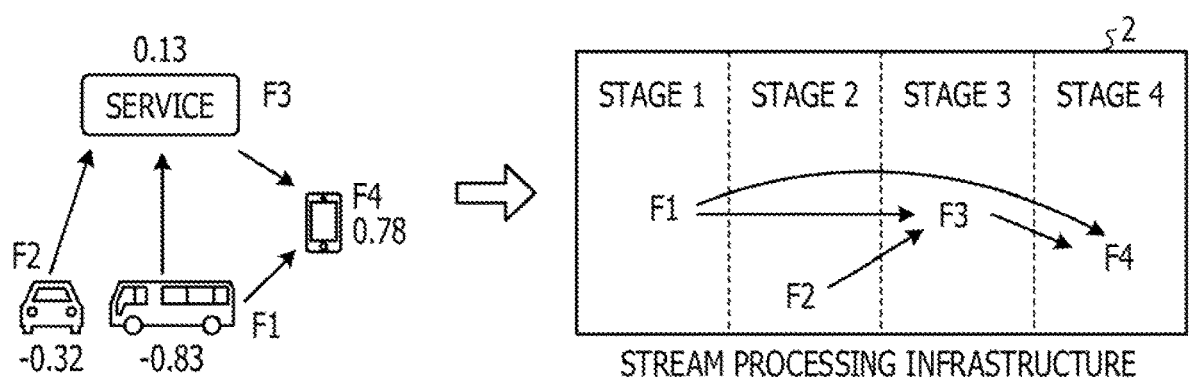
FIG. 7 is a diagram illustrating an example of a deployment unit according to the embodiment.

An example of the deployment unit 13 according to the embodiment will now be described with reference to FIG. 7. FIG. 7 is a diagram illustrating an example of a deployment unit according to the embodiment. In FIG. 7, deployment based on the weighted-degree-assigned directed graph 24 illustrated in a left diagram of FIG. 7 will be described. Note that it is assumed that the number of stages of "4" is set in the stream processing infrastructure 2.

As illustrated in FIG. 7, the deployment unit 13 adds the processes represented by the respective nodes to the corresponding stages of the stream processing infrastructure 2 such that each node having a smaller weighted degree in the weighted-degree-assigned directed graph 24 is at a more upstream stage. In the weighted-degree-assigned directed graph 24 in this case, the weighted degree of the node representing the car-related process is equal to "−0.32", and the weighted degree of the node representing the bus-related process is equal to "−0.83". In addition, the weighted degree of the node representing the service-related process is equal to "0.13", and the weighted degree of the node representing the smartphone-related process is equal to "0.78".

Accordingly, the deployment unit 13 adds the bus-related process (F1) represented by the node having the smallest weighted degree to a stage 1 of the stream processing infrastructure 2. The deployment unit 13 adds the car-related process (F2) represented by the node having the next smallest weighted degree to a stage 2 of the stream processing infrastructure 2. The deployment unit 13 adds the service-related process (F3) represented by the node having the next smallest weighted degree to a stage 3 of the stream processing infrastructure 2. The deployment unit 13 then adds the smartphone-related process (F4) represented by the node having the largest weighted degree to a stage 4 of the stream processing infrastructure 2. The deployment unit 13 then sets the data transmission destinations of F1 to F3 and F4. The deployment unit 13 sets the data transmission destination of F2 to F3. The deployment unit 13 sets the data transmission destination of F3 to F4.

In this way, the deployment unit 13 deploys the processes represented by the corresponding nodes such that a node having a smaller data communication amount indicated by the weighted degree is at a more upstream stage. Consequently, the communication amount of a communication path via which data is re-input to the first stage reduces, and deterioration in performance of the stream processing infrastructure 2 may be suppressed. That is, the deployment unit 13 may automatically create an efficient data flow in a pipeline in the stream processing infrastructure 2.

Figure 8:
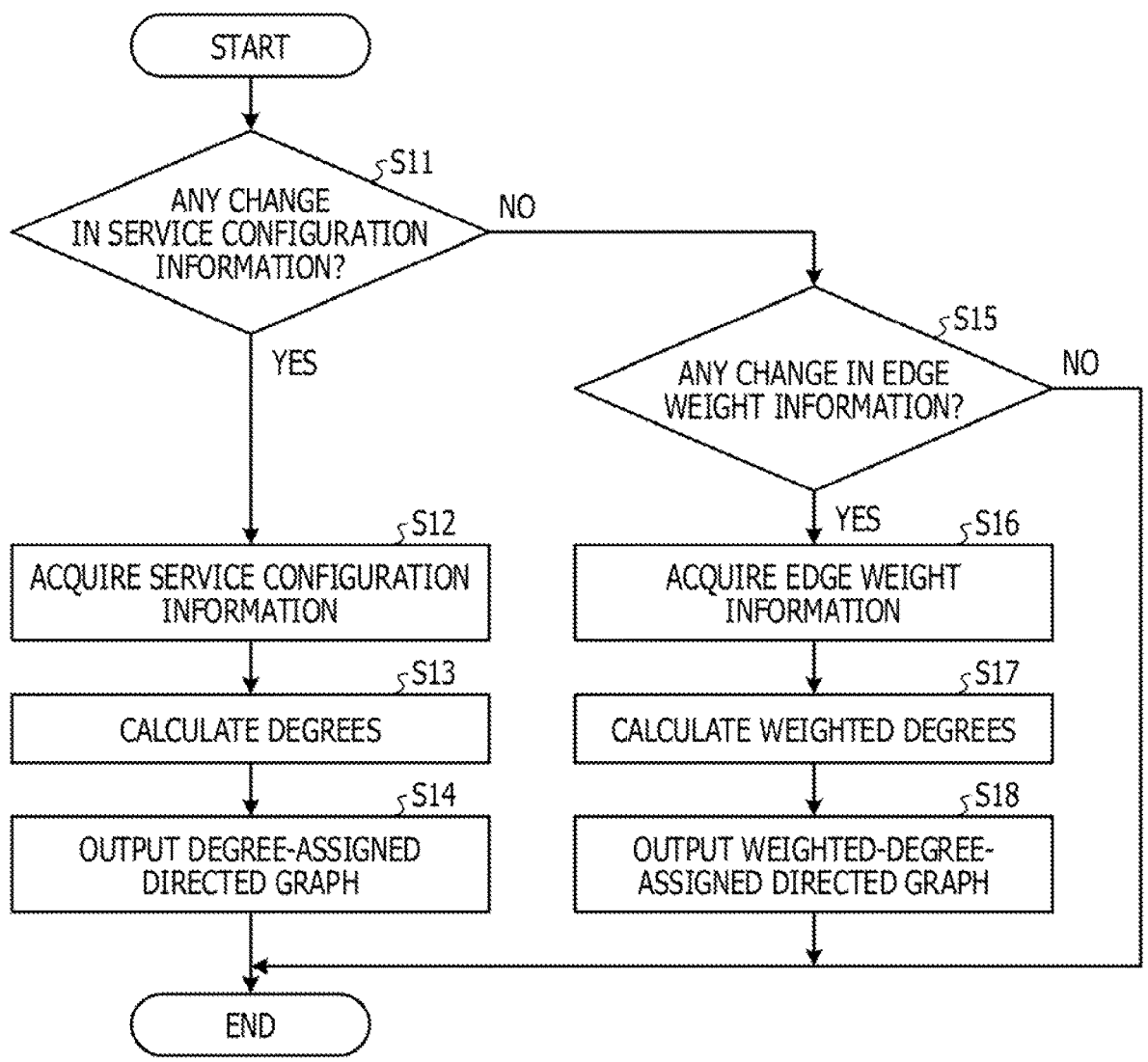
FIG. 8 is a diagram illustrating an example of a flowchart of a graph management process according to the embodiment.

FIG. 8 is a diagram illustrating an example of a flowchart of a graph management process according to the embodiment. As illustrated in FIG. 8, the graph management unit 11 determines whether a change has occurred in the service configuration information 21 (step S11). Upon determining that a change has occurred in the service configuration information 21 (step S11; Yes), the graph management unit 11 acquires the service configuration information 21 (step S12).

The graph management unit 11 calculates the degree of each node in the directed graph obtained from the service configuration information 21 (step S13). For example, the graph management unit 11 subtracts, for each node in the directed graph, the number of outgoing edges of the node (the number of outflows) from the number of incoming edges of the node (the number of inflows) to calculate the degree that is the subtraction result.

Then, the graph management unit 11 outputs the degree-assigned directed graph 22 (step S14). The graph management unit 11 then ends the graph management process.

On the other hand, upon determining that there is no change in the service configuration information 21 (step S11; No), the graph management unit 11 determines whether a change has occurred in the edge weight information 23 (step S15). Upon determining that a change has occurred in the edge weight information 23 (step S15; Yes), the graph management unit 11 acquires the edge weight information 23 (step S16).

The graph management unit 11 calculates the weighted degree for each node in the directed graph, with reference to the edge weight information 23 (step S17). For example, the graph management unit 11 subtracts, for each node in the directed graph with reference to the edge weight information 23, the weight of the outgoing edge of the node from the weight of the incoming edge of the node to calculate the weighted degree that is the subtraction result.

The graph management unit 11 then outputs the weighted-degree-assigned directed graph 24 (step S18). The graph management unit 11 then ends the graph management process.

Figure 9:
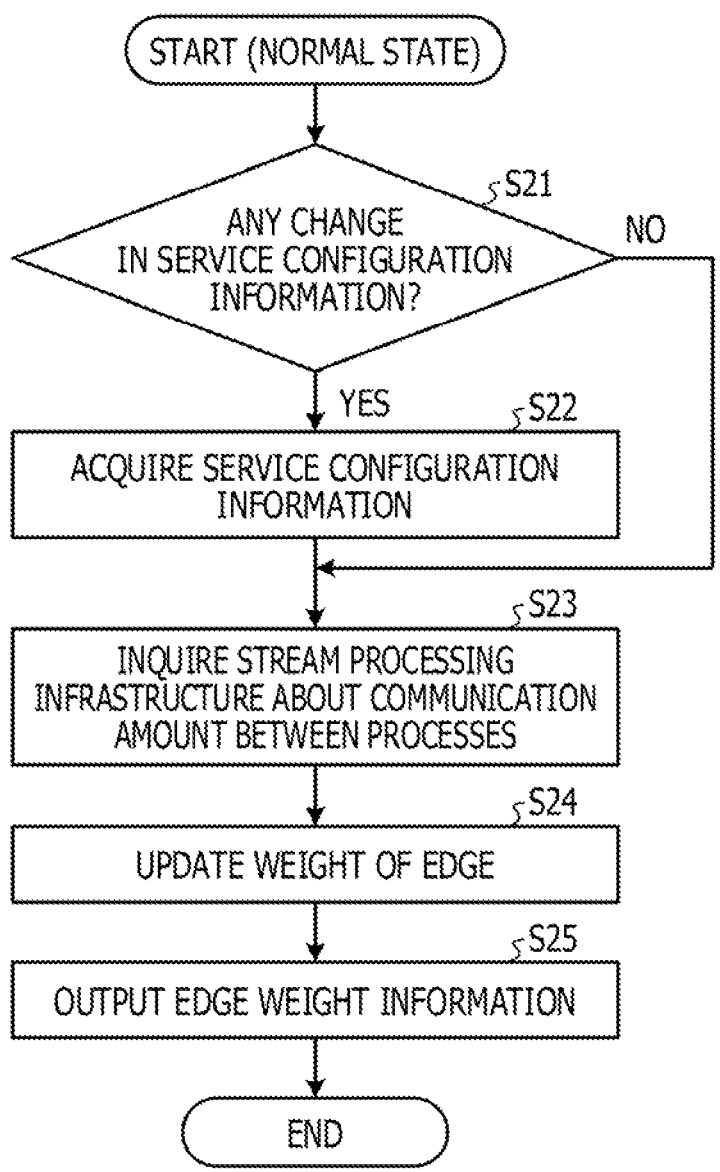
FIG. 9 is a diagram illustrating an example of a flowchart of an observation process according to the embodiment.

FIG. 9 is a diagram illustrating an example of a flowchart of an observation process according to the embodiment. Note that the observation unit 12 performs the observation process at predetermined intervals.

As illustrated in FIG. 9, the observation unit 12 determines whether a change has occurred in the service configuration information 21 (step S21). If the observation unit 12 determines that there is no change in the service configuration information 21 (step S21; No), the process proceeds to step S23.

On the other hand, if the observation unit 12 determines that a change has occurred in the service configuration information 21 (step S21; Yes), the observation unit 12 acquires the service configuration information 21 (step S22). The observation unit 12 inquires the stream processing infrastructure 2 about the communication amount between the processes (step S23). For example, the observation unit 12 acquires processes having a coupling relationship from the service configuration information 21. The observation unit 12 inquires the stream processing infrastructure 2 about the data communication amount between the processes having the coupling relationship.

The observation unit 12 updates the weight of the edge between the corresponding nodes in accordance with the communication amount between the processes (step S24). The observation unit 12 then outputs the updated edge weight information 23 (step S25).

According to the embodiment described above, the information processing apparatus 1 generates a directed graph in which processes in the stream processing infrastructure 2 are represented by nodes and data input/output relationships between the nodes are represented by edges. The information processing apparatus 1 calculates a degree of each of the nodes in the directed graph, by using a certain weight of a corresponding edge among the edges constituting the generated directed graph. The information processing apparatus 1 deploys the process represented by each of the nodes at a stage of a pipeline, based on the calculated degree of the node. With such a configuration, the information processing apparatus 1 may automatically create an efficient data flow in the pipeline in the stream processing infrastructure 2. For example, the information processing apparatus 1 reduces the number of unnecessary re-inputs to the first stage of the pipeline. In this way, the information processing apparatus 1 may suppress deterioration in performance of the stream processing infrastructure 2. In addition, the information processing apparatus 1 may automatically create a data flow in the pipeline from a directed graph generated without a service designer being cognizant of the stream processing infrastructure 2.

In addition, the information processing apparatus 1 observes data communication amounts between the processes in the stream processing infrastructure 2. The information processing apparatus 1 calculates weights of the respective edges constituting the directed graph, based on the observed data communication amounts between the processes. The information processing apparatus 1 calculates a weighted degree of each of the nodes in the directed graph, by using a weight of the edge that is incoming to the node and a weight of the edge that is outgoing from the node. The information processing apparatus 1 deploys the process represented by each of the nodes at a stage of the pipeline such that the process represented the node having a smaller weighted degree is at a more upstream stage. With such a configuration, the information processing apparatus 1 calculates the weighted degree of each node from the weights of the edges calculated from the data communication amounts, and deploys the processes represented by the respective nodes at the corresponding stages such that the process represented by each node having a smaller weighted degree is at a more upstream stage. In this way, the number of pieces of data unnecessarily re-input to the first stage may be reduced. As a result, the information processing apparatus 1 may suppress deterioration in performance of the stream processing infrastructure 2.

Furthermore, the information processing apparatus 1 calculates, as the weighted degree, a value obtained by subtracting the weight of the edge that is outgoing from the node from the weight of the edge that is incoming to the node. With such a configuration, the information processing apparatus 1 deploys the processes represented by the respective nodes at the corresponding stages such that the process represented by each node having a smaller weighted degree is at a more upstream stage. In this way, the number of pieces of data unnecessarily re-input to the first stage may be reduced. As a result, the information processing apparatus 1 may suppress deterioration in performance of the stream processing infrastructure 2.

Further, the information processing apparatus 1 recalculates the weighted degree of each of the nodes at a timing at which a change occurs in the weight of any one of the edges in the directed graph. The information processing apparatus 1 re-creates, at a specific timing, the pipeline by using the weighted degrees. With such a configuration, the information processing apparatus 1 may automatically re-create the pipeline.

In the embodiment, the case has been described where the data stream processing system 9 includes the information processing apparatus 1 and the stream processing infrastructure 2. However, the data stream processing system 9 is not limited to this configuration. The data stream processing system 9 may be the information processing apparatus 1 including the stream processing infrastructure 2. Alternatively, the data stream processing system 9 may include an apparatus that generates the service configuration information 21, an apparatus including the observation unit 12, an apparatus including the graph management unit 11 and the deployment unit 13, and the stream processing infrastructure 2. In such a case, the apparatuses may be coupled to one another via a network.

The components of the information processing apparatus 1 illustrated in the drawings do not necessarily have to be physically configured as illustrated in the drawings. That is, the specific forms of distribution and integration of the information processing apparatus 1 are not limited to those illustrated in the drawings, and all or part thereof may be configured to be functionally or physically distributed or integrated in given units in accordance with various loads, usage states, and so on. For example, the graph management unit 11 may be divided into a first graph management unit that generates the degree-assigned directed graph 22 and a second graph management unit that generates the weighted-degree-assigned directed graph 24. In addition, the storage unit (not illustrated) may be coupled to the information processing apparatus 1 via a network as an external apparatus of the information processing apparatus 1.

Figure 10:
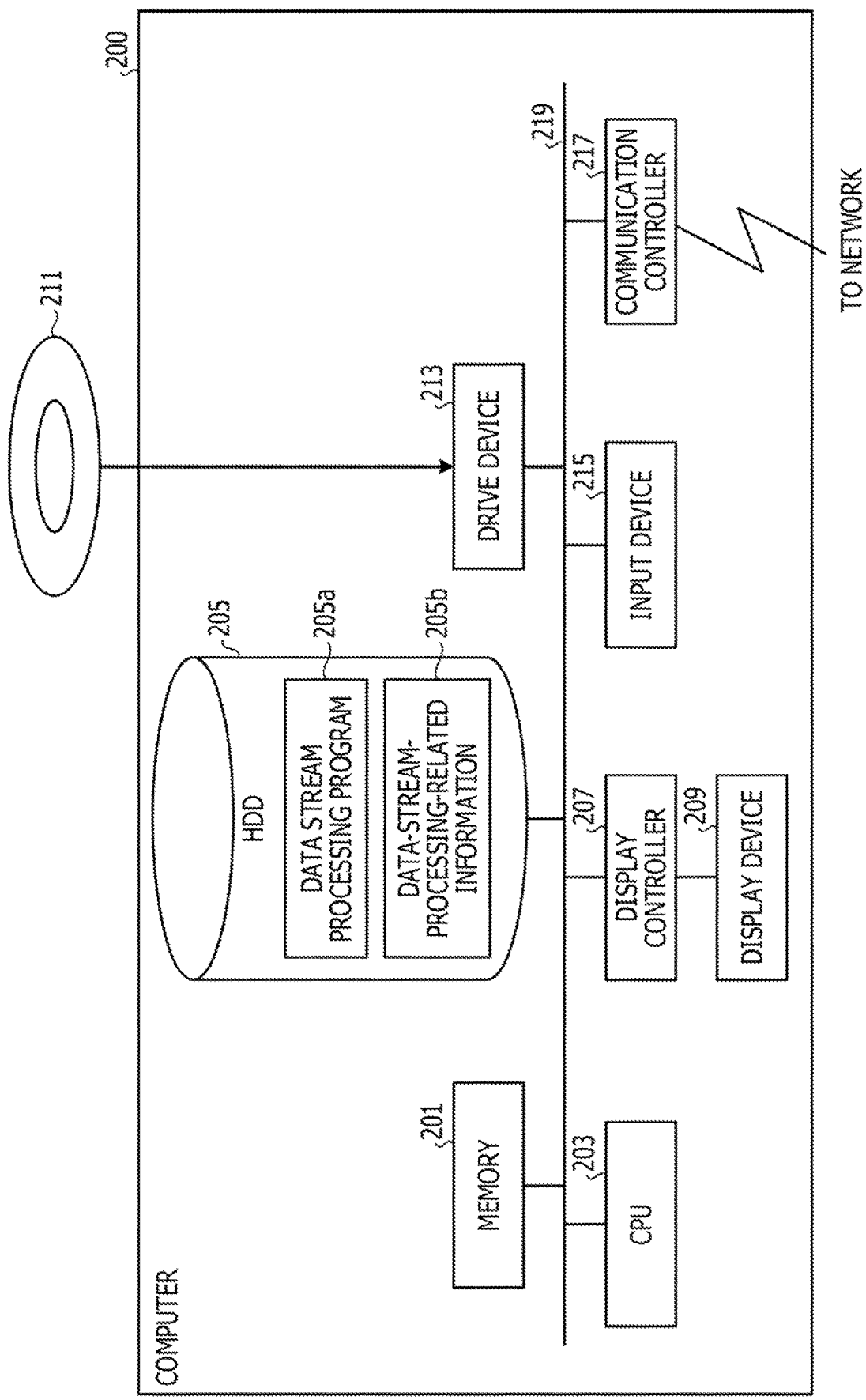
FIG. 10 is a diagram illustrating an example of a computer that executes a data stream processing program.
Figure 11:
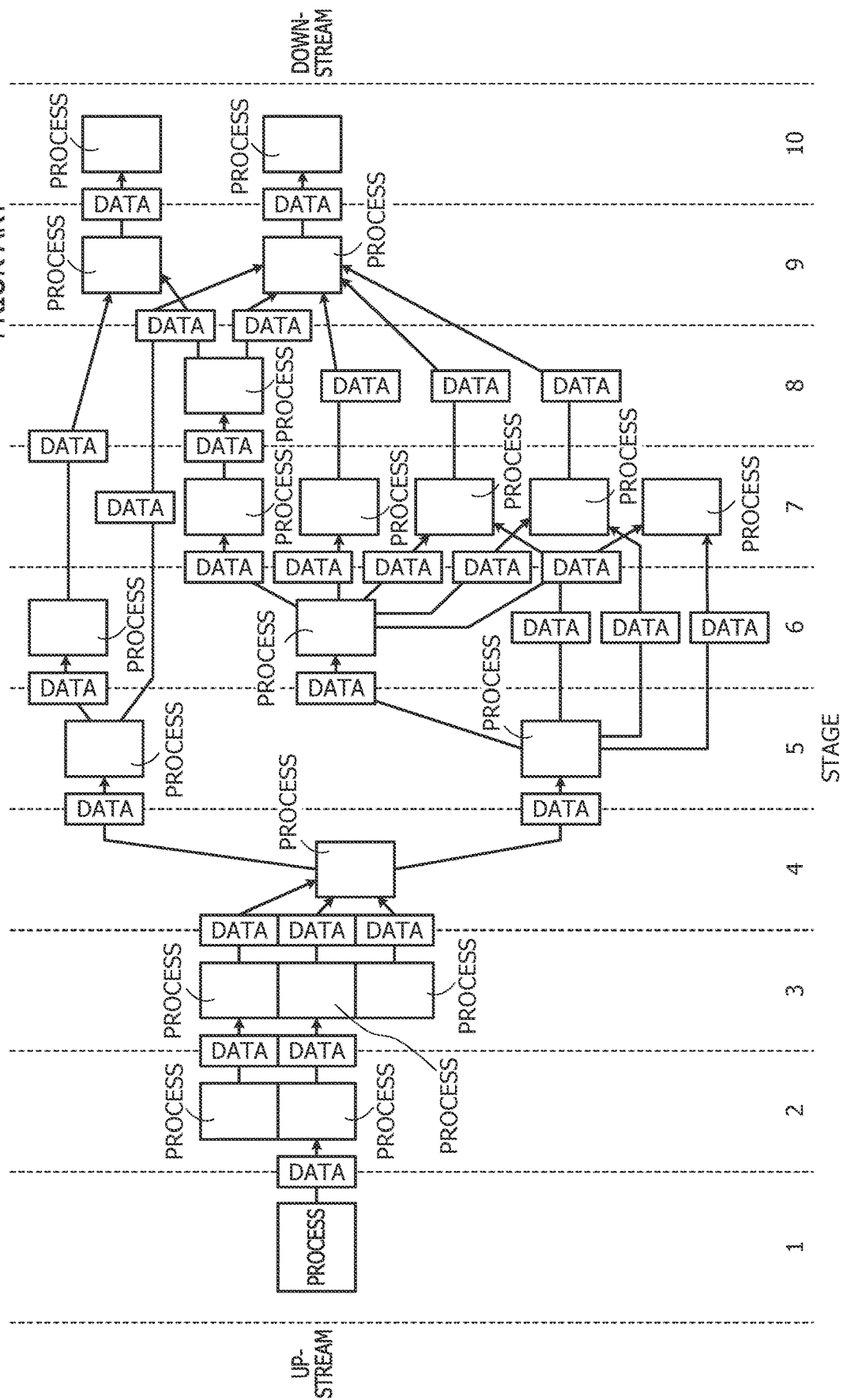
FIG. 11 is a diagram illustrating a reference example of a pipeline of a stream processing infrastructure.

The various processes described in the embodiment above may be implemented as a result of a computer such as a personal computer or a workstation executing a program prepared in advance. Accordingly, a description will be given below of an example of a computer that executes a data stream processing program for implementing substantially the same functions as those of the information processing apparatus 1 illustrated in FIG. 1. FIG. 10 is a diagram illustrating an example of a computer that executes the data stream processing program.

As illustrated in FIG. 10, a computer 200 includes a CPU 203 that performs various kinds of arithmetic processing, an input device 215 that accepts input of data from a user, and a display controller 207 that controls a display device 209. The computer 200 also includes a drive device 213 that reads a program or the like from a storage medium, and a communication controller 217 that exchanges data with another computer via a network. The computer 200 also includes a memory 201 that temporarily stores various kinds of information, and a hard disk drive (HDD) 205. The memory 201, the CPU 203, the HDD 205, the display controller 207, the drive device 213, the input device 215, and the communication controller 217 are coupled to one another via a bus 219.

The drive device 213 is, for example, a device for a removable disk 211. The HDD 205 stores a data stream processing program 205a and data-stream-processing-related information 205b.

The CPU 203 reads the data stream processing program 205a, loads the data stream processing program 205a to the memory 201, and executes the data stream processing program 205a as processes. Such processes correspond to the respective functional units of the information processing apparatus 1. The data-stream-processing-related information 205b corresponds to the service configuration information 21, the edge weight information 23, the degree-assigned directed graph 22, and the weighted-degree-assigned directed graph 24. For example, the removable disk 211 stores information such as the data stream processing program 205a.

Note that the data stream processing program 205a does not necessarily have to be initially stored in the HDD 205. For example, the data stream processing program 205a may be stored in a "portable physical medium" such as a flexible disk (FD), a compact disk read-only memory (CD-ROM), a digital versatile disk (DVD), a magneto-optical disk, or an integrated circuit (IC) card inserted into the computer 200.

The computer 200 may then read the data stream processing program 205a from the portable physical medium and execute the data stream processing program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented data stream processing method comprising:
    generating a directed graph in which processings in a stream processing infrastructure are represented by nodes and data input/output relationships between the nodes are represented by edges;
    calculating a degree of each of the nodes based on a weight of each of the edges;
    deploying, based on the calculated degree of each of the nodes, the processings represented by the nodes at stages of a pipeline in the stream processing infrastructure;
    observing data communications amounts between the processings in the stream processing infrastructure; and
    determining, based on the observed data communication amounts between the processings, an outgoing direction weight of each of the edges and an incoming direction weight of each of the edges, wherein
    the deploying includes deploying a first process of the processings at a first stage of the stages and a second process of the processings at a second stage of the stages,
    the degree of the second process is less than the degree of the first process, and
    the second stage is an upstream stage more than the first stage.

2. The data stream processing method according to claim 1, wherein
    the calculating of the degree includes calculating the degree of each of the edges by subtracting the outgoing direction weight of each of the edges from the incoming direction weight of each of the edges.

3. The data stream processing method according to claim 1, further comprising:
    recalculating the degree of each of the nodes in response to detecting that at least one of the weight of each of the edges has changed; and
    modifying, based on the recalculated degrees, the pipeline.

4. A data stream processing system comprising:
    one or more memories; and
    one or more processors coupled to the memories and the processors configured to:
        generate a directed graph in Which processings in a stream processing infrastructure are represented by nodes and data input/output relationships between the nodes are represented by edges,
        perform calculation of a degree of each of the nodes based on a weight of each of the edges, perform, based on the calculated degree of each of the nodes, deployment of the processings represented by the nodes at stages of a pipeline in the stream processing infrastructure, observe data communication amounts between the processings in the stream processing infrastructure, and determine, based on the observed data communication amounts between the proces sings, an outgoing direction weight of each of the edges and an incoming direction weight of each of the edges, wherein the deployment includes deploying a first process of the processings at a first stage of the stages and a second process of the processings at a second stage of the stages, the degree of the second process is less than the degree of the first process, and the second stage is an upstream stage more than the first stage.

5. The data stream processing system according to claim 4, wherein the calculation of the degree includes calculating the degree of each of the edges by, subtracting the outgoing direction weight of each of the edges from the incoming direction weight of each of the edges.

6. The data stream processing system according to claim 4, wherein the one or more processors are further configured to:

recalculate the degree of each of the nodes in response to detecting that at least one of the weight of each of the edges has changed, and modify, based on the recalculated degrees, the pipeline.

7. A non-transitory computer-readable medium storing instructions executed by one or more computers, the instructions comprising:

one or more instructions for generating a directed graph in which processings in a stream processing infrastructure are represented by nodes and data input/output relationships between the nodes are represented by edges;

one or more instructions for calculating a degree of each of the nodes based on a weight of each of the edges;

one or more instructions for deploying, based on the calculated degree of each of the nodes, the processings represented by the nodes at stages of a pipeline in the stream processing infrastructure, one or more instructions for observing data communication amounts between the processings in the stream processing infrastructure; and one or more instructions for determining, based on the observed data communication amounts between the processings, an outgoing direction weight of each of the edges and an incoming direction weight of each of the edges, wherein the deploying includes deploying a first process of the processings at a first stage of the stages and a second process of the processings at a second stage of the stages, the degree of the second process is less than the degree of the first process, and the second stage is an upstream stage more than the first stage.

8. The non-transitory computer-readable medium according to claim 7, wherein the calculating of the degree includes calculating the degree of each of the edges by subtracting the outgoing direction weight of each of the edges from the incoming direction weight of each of the edges.

9. The non-transitory computer-readable medium according to claim 7, the instructions further comprising:

one or more instructions for recalculating the degree of each of the nodes in response to detecting that at least one of the weight of each of the edges has changed; and one or more instructions for modifying, based on the recalculated degrees, the pipeline.

* * * * *